United States Patent [19]

James

[11] Patent Number: 5,033,724

[45] Date of Patent: Jul. 23, 1991

[54] MACHINE TOOL VISE

[76] Inventor: Lawrence W. James, 9769 W. Fairview, Littleton, Colo. 80127

[21] Appl. No.: 418,391

[22] Filed: Oct. 6, 1989

[51] Int. Cl.$^5$ .............. B23Q 3/02

[52] U.S. Cl. .............. 269/136; 269/244; 269/258; 269/266; 269/154; 269/156

[58] Field of Search .............. 269/152, 154, 155, 156, 269/258, 244, 219, 221, 139, 164, 109, 111, 113, 114, 118, 140, 262, 901, 136, 266, 267, 270

[56] References Cited

U.S. PATENT DOCUMENTS

| | | | |
|---|---|---|---|
| 449,987 | 4/1891 | Wies | 269/261 |
| 1,203,152 | 10/1916 | Steudner | 269/258 |
| 2,724,296 | 11/1955 | Parrish et al. | 269/268 |
| 2,880,638 | 4/1959 | Muggli et al. . | |
| 3,397,880 | 8/1968 | Kuban . | |
| 4,098,500 | 7/1978 | Lenz | 269/136 |
| 4,205,833 | 6/1980 | Lenz . | |
| 4,299,146 | 11/1981 | Phelps | 269/258 |
| 4,529,183 | 7/1985 | Kranon et al. . | |
| 4,632,375 | 12/1986 | Yang | 269/258 |
| 4,648,585 | 3/1987 | Yang | 269/262 |
| 4,824,085 | 4/1989 | Buchler | 269/221 |

*Primary Examiner*—Robert C. Watson
*Attorney, Agent, or Firm*—Dorr, Carson, Sloan & Peterson

[57] ABSTRACT

A machine vise for holding workpieces on a milling machine or the like comprises a pair of movable jaws arranged to move in parallel and to cooperate with a fixed jaw for holding workpieces for machining. A yoke is pivotally mounted with respect to the jaws and operates to provide equal pressures for gripping with equal pressure separate workpieces or different parts of the same workpieces.

4 Claims, 6 Drawing Sheets

MACHINE TOOL VISE

This invention relates to machine tool vises and the like and particularly to an improved machine vise for holding workpieces of regular or irregular configuration. The vise of this invention is also useful for holding a plurality of separate workpieces at the same time. A further advantage is provided in that a single jaw closing mechanism may be employed for gripping a plurality of workpieces of different dimensions to hold them in rigid positions with respect to one another.

It is an object of this invention to provide an improved vise particularly for use on milling machines and the like.

It is a further object of this invention to provide a machine vise including an improved arrangement for securely holding workpieces of irregular or odd shapes.

It is another object of this invention to provide an improved machine vise having a multiplicity of gripping jaws or fingers which may be set in gripping engagement with a workpiece by a single operation of the vise.

It is another object of this invention to provide a machine vise capable of simultaneously gripping and securing in side by side relationship workpieces of different dimensions or different sized parts of the same workpieces.

It is a further object of this invention to provide an improved machine vise which is capable of securely holding workpieces of both hard and relatively soft materials.

It is a still further object of this invention to provide an improved machine vise constructed and arranged to apply a single forward thrust to a pair of parallel independently movable jaws to apply a forward and downward pressure on both jaws.

BRIEF SUMMARY OF THE INVENTION

The vise of this invention is provided with a fixed jaw and two movable jaws which are moved along parallel axes by pressure applied to the center of a transverse yoke which engages both jaws at its outer ends and the pressure for opening and closing the vise is applied at the center of the yoke. An arrangement for exerting downward pressure on the yoke is also provided.

The features of novelty which characterize this invention are pointed out with particularity in the claims annexed to and forming a part of this specification. The invention itself, however, both as to its organization and manner of operation, together with further objects and advantages thereof may best be understood upon reference to the following description taken in connection with the accompanying drawings the figures of which are described briefly as follows:

DETAILED DESCRIPTION

Figure 1:
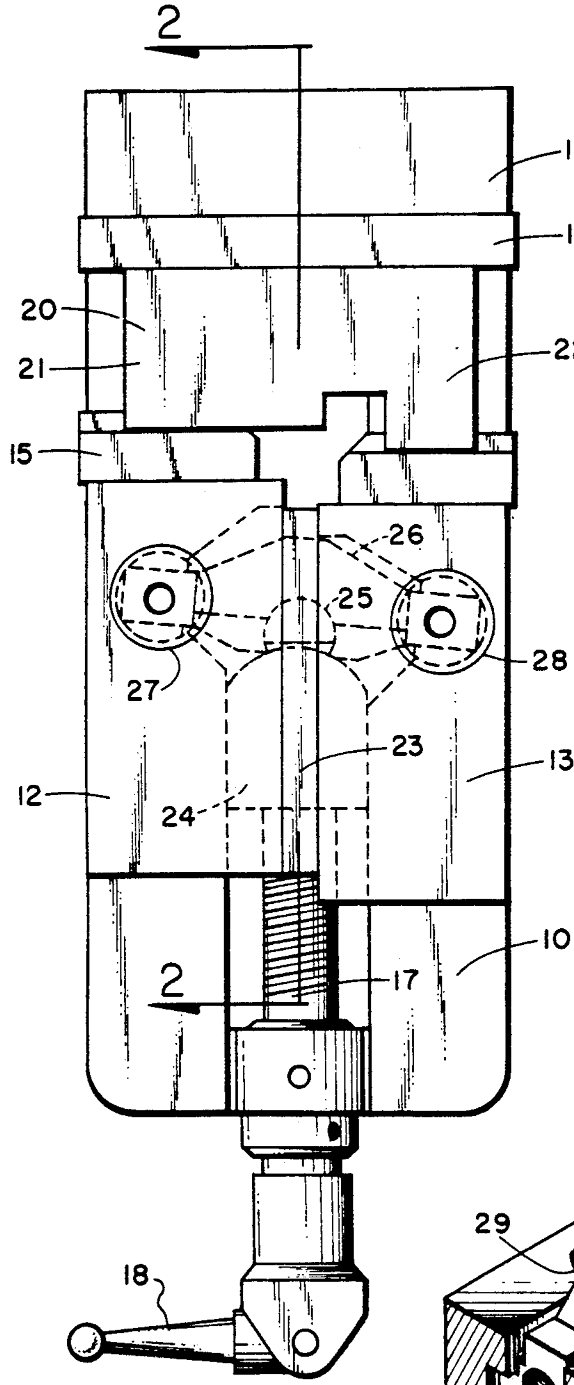
FIG. 1 is a plan view of a machine vise embodying the invention.

Referring now to the drawings, FIG. 1 is a plan view of a machine vise having a base 10, and a fixed jaw 11 at the far end, and a pair of sliding jaws 12 and 13. The fixed jaw 11 has a face plate 14 and the sliding jaws 12 and 13 have face plates 15 and 16 respectively. The movable jaws 12 and 13 are driven by operation of a shaft 17 having a handle 18. A workpiece 20 is illustrated in position between the fixed jaw 14 and movable plates 15 and 16. The workpiece has a portion 21 of lesser width at its left end which is in engagement with the face plate 15 and a wider portion 22 on its right hand end in engagement with the face plate 16.

A spacer 23 having legs 23*a* and 23*b* is provided between the jaws 12 and 13 to maintain the alignment of the jaws and to prevent yawing movement of the jaws. A setscrew 23*c* is provided in the leg 23*b* of the spacer 23 to maintain the headpiece 24 in position between the legs 23*a* and 23*b* of the spacer.

Figure 5:
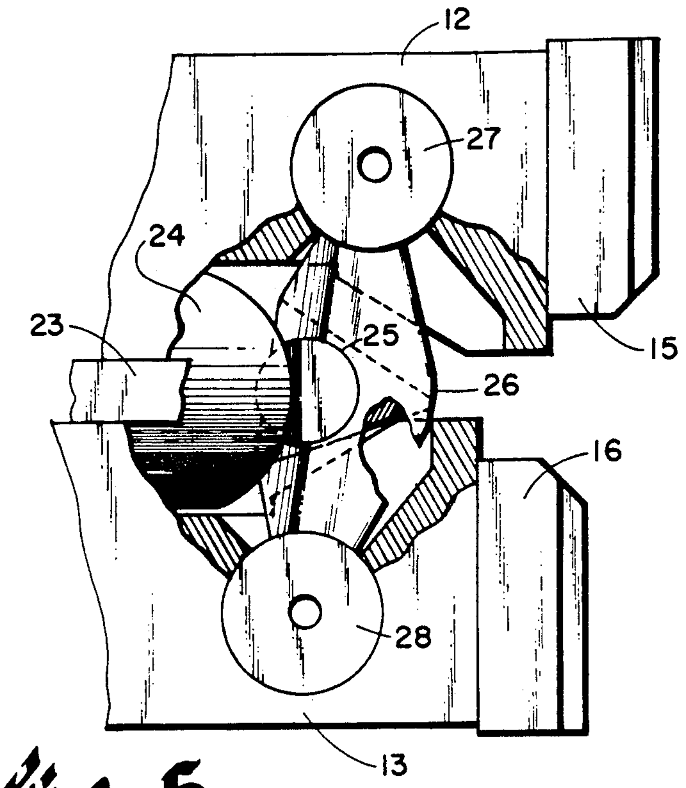
FIG. 5 is a view similar to FIG. 4 showing the yoke rotated slightly toward the right.
Figure 6:
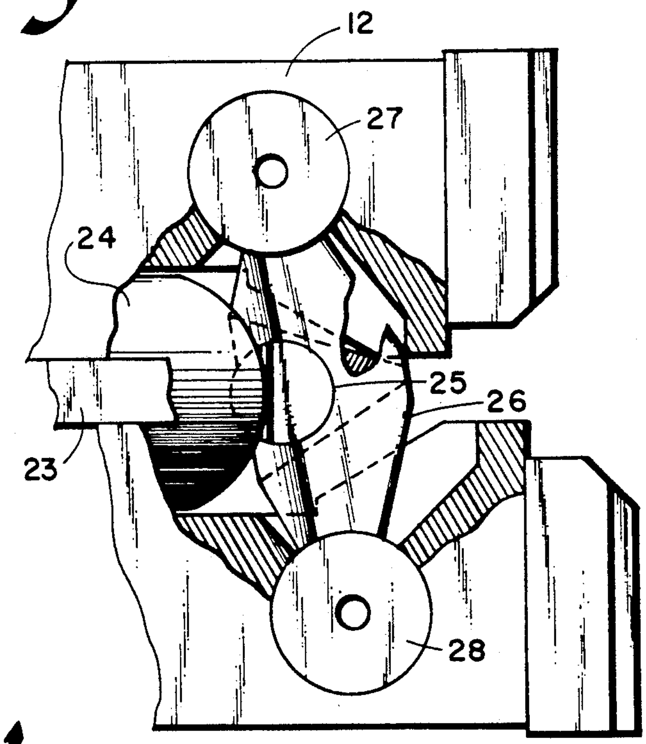
FIG. 6 is a view similar to FIG. 5 illustrating the yoke rotated slightly to the left.

In FIG. 1, the jaws 12 and 13 are shown in their fixed positions when the vise is closed against the workpiece 20. As shown in FIG. 1, the face plates 15 and 16 on the jaws 12 and 13, respectively, rest against the portions 21 and 22 of the workpiece 20. When the vise is tightened the workpiece is securely held between the plate 14 and the plates 15 and 16. The pressure exerted by the vise through the shaft 17 is directed by the shaft 17 through a headpiece 24 pressed against a cylindrical member 25 in a yoke assembly shown in dotted lines and designated at 26. The yoke is pivotally and slidably mounted in cylinders 27 and 28 in the jaws 12 and 13, respectively. The yoke 26 is more clearly shown in FIGS. 5 and 6 showing the extreme positions of the yoke, the jaw 12 being advanced in FIG. 5 and the jaw 13 advanced in FIG. 6.

Figure 4:
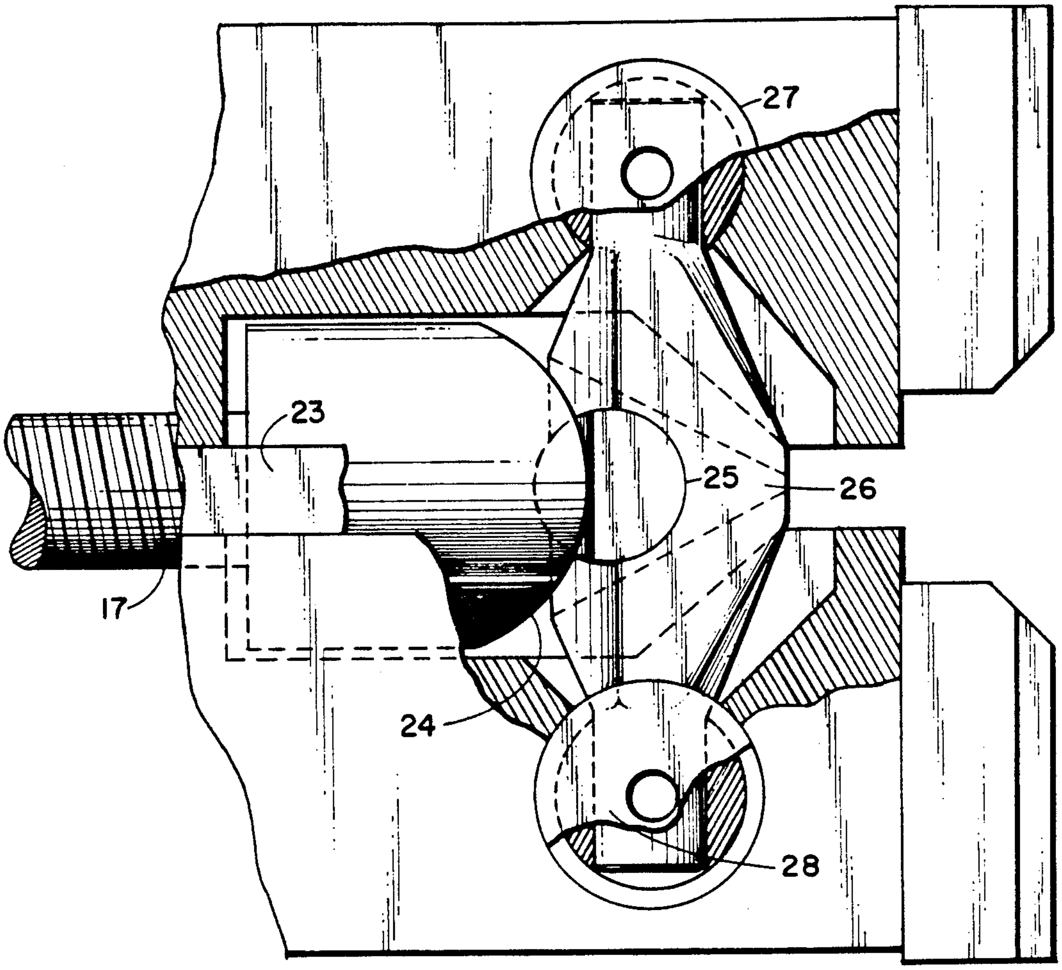
FIG. 4 is an enlarged plan view of a portion of the vise illustrated in FIG. 1 with portions of the movable jaws broken away to show features of the construction and with the longitudinal axis of the yoke normal to the longitudinal axis of the vise.

From the foregoing it will be apparent that when a workpiece is positioned against the fixed jaw 14 and the jaws are advanced toward the workpiece, they will advance until one or the other meets the workpiece or both meet the workpiece. The position of the yoke after engaging the workpiece will depend on the dimensions of the workpiece. If the workpiece is of uniform thickness, the jaws will take the position indicated in FIG. 4 and if the workpiece has different dimensions as illustrated in FIG. 1 the jaws will advance until one strikes the workpiece and thereafter further advance will bring the other jaw into engagement with the workpiece. FIGS. 4, 5 and 6 thus illustrate three different conditions depending upon the workpiece involved and illustrate the manner in which the yoke 26 operates to bring both jaws 12 and 13 into engagement with the workpiece whereupon further tightening of the jaws brings equal pressure to bear on both portions of the workpiece.

Figure 2:
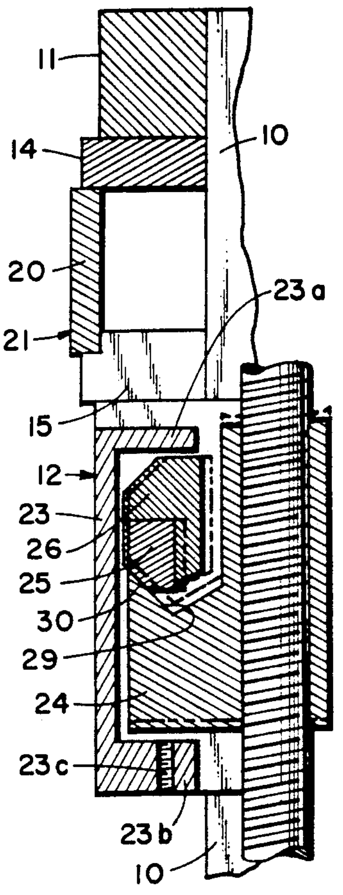
FIG. 2 is a somewhat diagrammatic partial sectional elevation view of the vise of FIG. 1 taken along the line 2—2 of FIG. 1.
Figure 3:
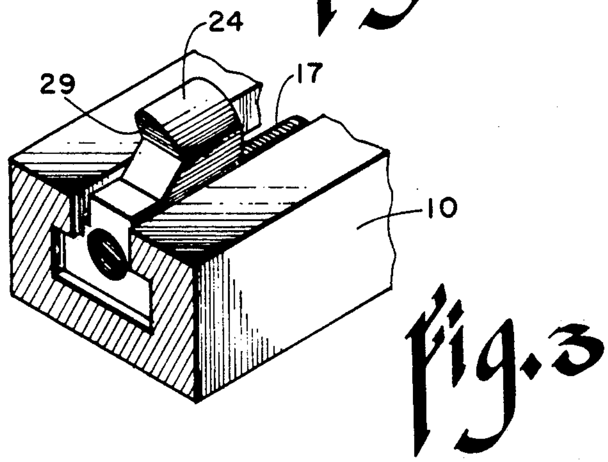
FIG. 3 is a partial somewhat diagrammatic, isometric view of the headpiece of FIG. 2 looking from the right hand far side of the figure.
Figure 7:
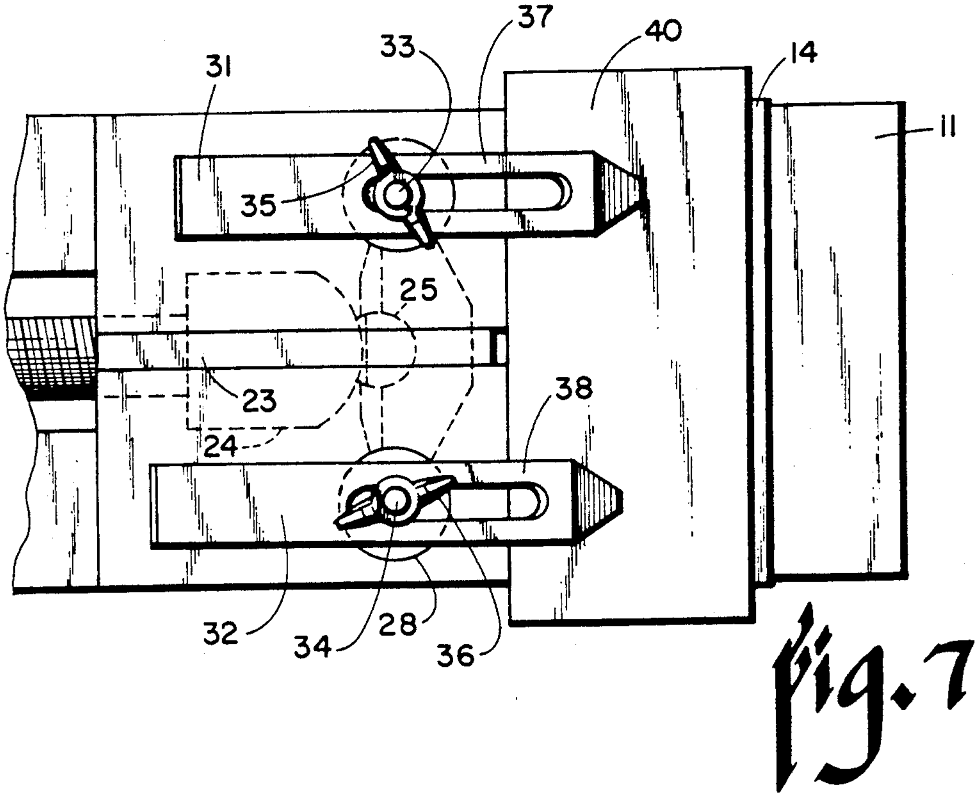
FIG. 7 is a plan view of the vise illustrating the use of screw clamps to hold a workpiece in position.
Figure 8:
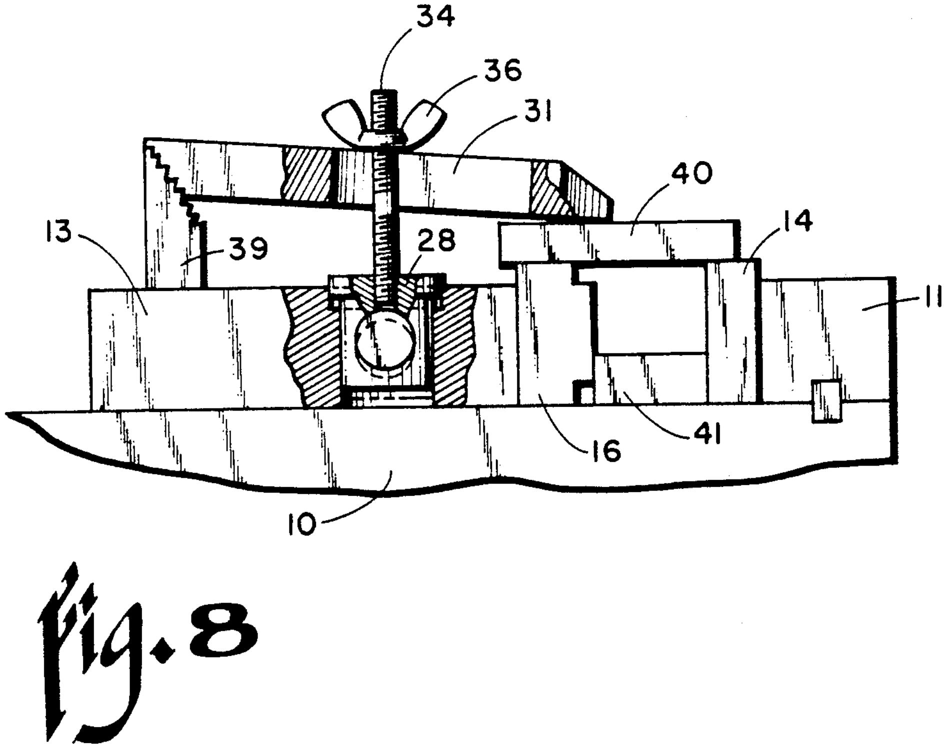
FIG. 8 is a elevation view, partly broken away, of the vise as shown in FIG. 7.

As shown in FIG. 2 the downwardly sloping face 29 of the head 24 engages the upwardly sloping face 30 of the cylinder 25 and thus the yoke 26 is urged downwardly and the jaws 12 and 13 are pressed against the base 10 of the vise. A downward position of the yoke is indicated by the dotted lines in FIG. 2. The downward thrust of the yoke is particularly useful in connection with the use of this arrangement for effecting a downward pressure on the workpiece and is particularly useful in connection with the holding of a workpiece on top of the jaws of the vise, this being an effective way for holding some relatively thin workpieces. By way of example, FIGS. 7 and 8 show applications of this invention in connection with the holding of relatively thin workpieces against the top of the jaws or face plates. The finger clamping arrangements of FIGS. 7 and 8 employ clamps 31 and 32 secured to the cylinders 27 and 28, respectively by threaded shafts 33 and 34 which are threaded into the central holes in the cylinders the clamping fingers being secured in place by wingnuts 35 and 36 tightened against the fingers 31 and 32 and which bear against the sides of the fingers 31 and 32 along slots 37 and 38. The positions of the fingers are adjusted by movement of the left hand ends of the fingers as viewed in FIGS. 7 and 8 with respect to a stepped post or support 39 shown in FIG. 8 as a support for the finger 31, a similar support being provided for the finger 32. The downward thrust produced by the sloping surface 29 of the head 24 and the engaging sloping surface 30 of the cylinder the provide a downward force on the yoke pushing the fingers downward against the workpiece indicated at 40. Thus the downward pressure on the fingers 31 and 32 is increased when the shaft 17 is turned to move the head piece 24 toward the yoke and the workpiece 40 is more securely held in position for milling. A resulting lower position of the yoke 26 is indicated by the horizontal dotted line in FIG. 2. As shown in FIG. 8 a solid block 41 is secured between the plates 14 and 16 to hold them in fixed position when the vise has been tightened.

It will be observed from the foregoing, that the yoke 26 has both ends journaled in the respective cylinders 27 and 28 and that the yoke is movable longitudinally, its ends being slidable with respect to the cylinders 27 and 28. This construction provides freedom of movement of the yoke in the cylinders and adjustment for any position which the yoke may take. This construction assures movement of the yoke in its various positions during operation of the vise without binding. The yoke ends are thus free to move longitudinally in the cylinders 27 and 28 if the yoke is required to move say from the position of FIG. 4 to that of either of the positions of FIGS. 5 and 6.

Figure 9:
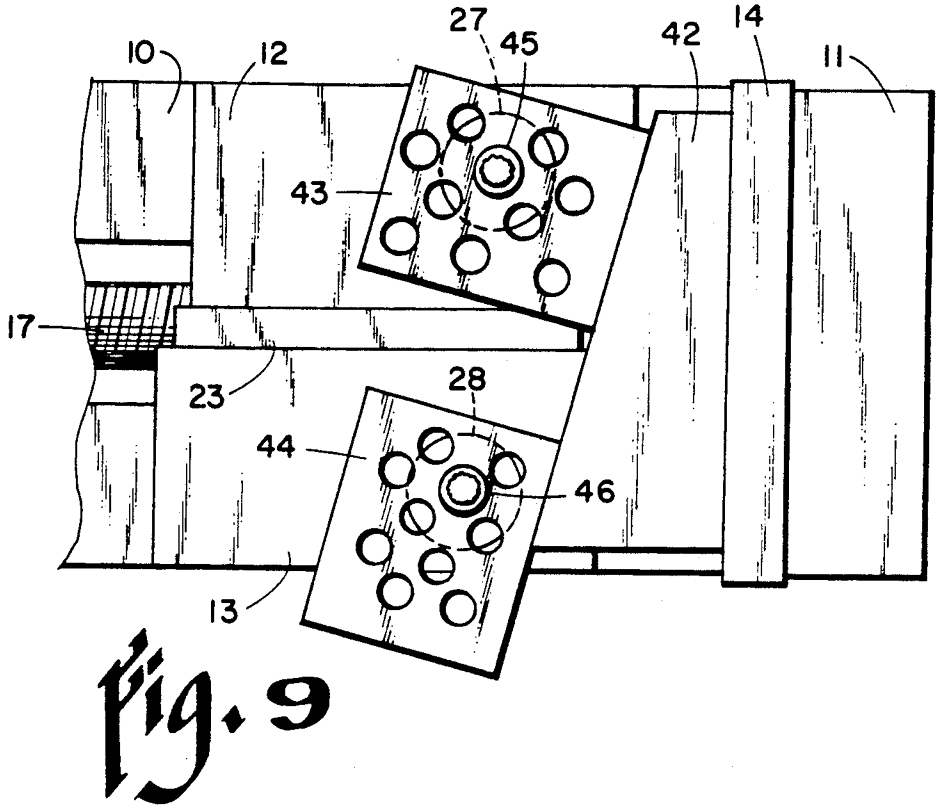
FIG. 9 is a plan view illustrating the use of workpiece engaging elements for using both jaws for holding a workpiece in engagement with the stationary jaw.
Figure 10:
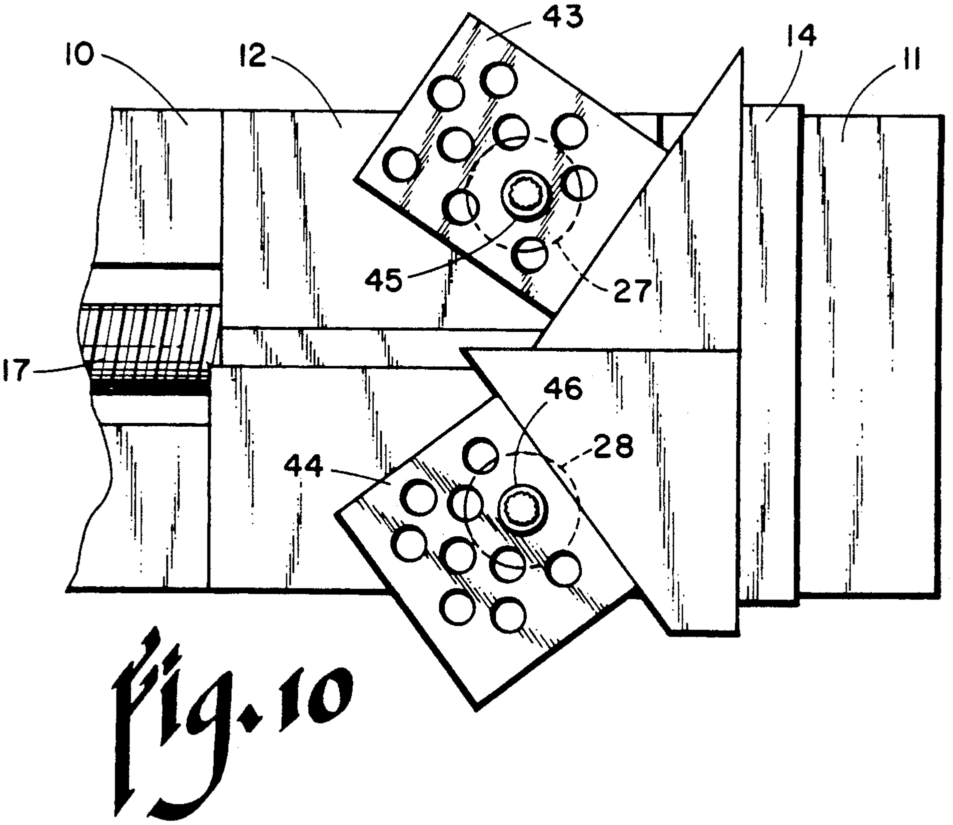
FIG. 10 is a plan view similar to FIG. 9 illustrating the use of workpiece engaging elements for holding separate workpieces against the stationary jaw.

FIG. 9 illustrates the manner in which the vise may be employed for holding a workpiece having non-parallel sides. As illustrated a workpiece 22 having non-parallel sides may be placed in the vise with one side against the face plate 14 and its other side engaged by two fittings 43 and 44 which are pivotally connected to the jaws 12 and 13, respectively by bolts or screws 45 and 46, respectively which are screwed into the threaded openings in the cylinders 27 and 28. Each of the fittings has been shown as provided with ten holes selectively spaced throughout the fitting so that a wide range of positions is available and the two fittings 43 and 44 can be moved to selected hole positions so that both of the fittings rest against the sloping side of the workpiece 42 and may be secured in position by the bolts 45 and 46. The enlarged number of holes and their arrangement about the area of the fittings makes it probable that a position of the fitting can be obtained which will enable the fitting to be aligned with the sloping wall of the workpiece. In any event a fitting may be selected or made to fit the requirements of a specific workpiece. When the fittings are in position the jaws may be operated to secure the workpiece firmly between the fittings and the face plate 14. The jaws may then be moved into a position to securely hold the workpiece for machining. In the illustration of the fittings in FIG. 10 each fitting is applied to a separate generally triangular workpiece and the two fittings when pressed toward the face plates will also be pressed toward one another and held firmly in position ready for the milling operation. The use of fittings such as 43 and 44 makes it possible to secure a wide range of shapes and sizes of workpieces in position on the vise. Obviously special cases may arise in which it is necessary to provide a fitting or fittings constructed for the purpose at the time.

Figure 11:
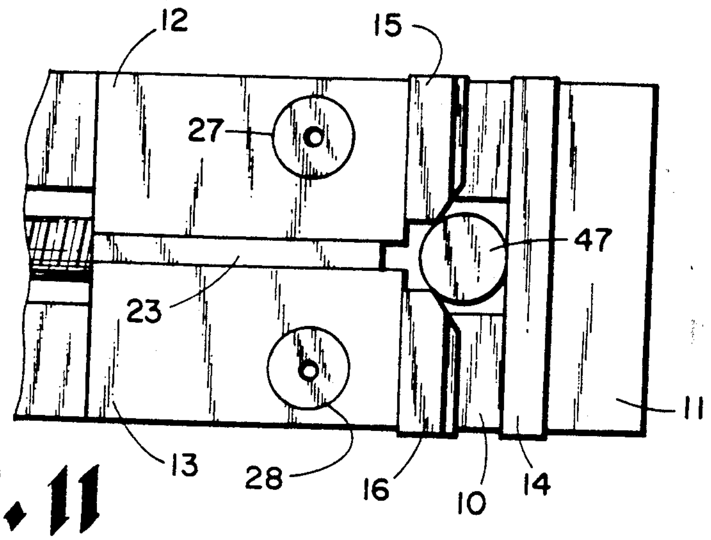
FIG. 11 is a plan view illustrating the holding of a cylindrical workpiece by both moving jaws of the vise.
Figure 12:
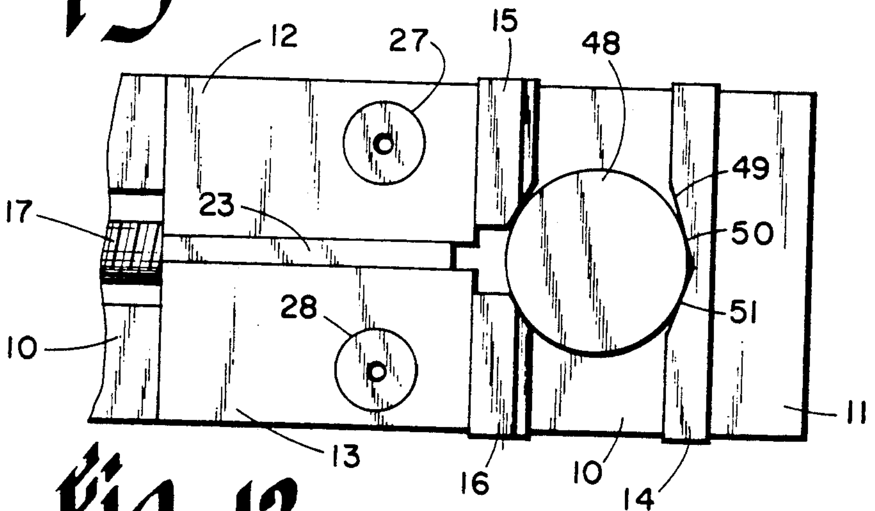
FIG. 12 is an illustration similar to FIG. 11 showing the holding of a cylindrical workpiece by four point engagement.
Figure 13:
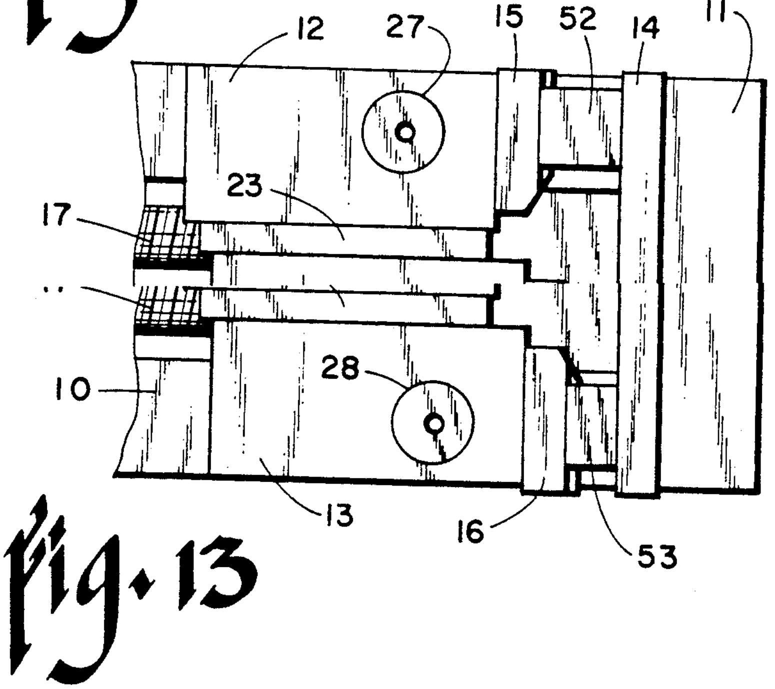
FIG. 13 is a view similar to FIGS. 11 and 12 illustrating the holding of different sizes of rectangular workpieces at the same time.

The machine vise of this invention as illustrated in FIG. 1 may be employed for a wide range of sizes and shapes of workpieces as illustrated for example in FIGS. 11, 12 and 13. The device of FIG. 11 is shown holding a cylindrical workpiece 47 which is engaged at three points and is securely held by the forward movement of the jaws 12 and 13. The workpiece is shown engaging the face plate 14 and the inside corner edges of the face plates 15 and 16. This provides a firm three point engagement for holding the workpiece 47 in readiness for machining.

FIG. 12 illustrates an arrangement for providing four point contact and gripping of a cylindrical workpiece as shown the workpiece at 48 is engaged by the two face plates 15 and 16 and by the sides of a notch or trough 49 formed in the face plate 14. The notched configuration of the plate 14 provides two points of engagement with the cylinder 48 indicated at 50 and 51.

FIG. 13 illustrates the use of the plates of this invention for holding two rectangular cross section workpieces of different sizes. As shown in this figure, two workpieces indicated at 52 and 53 are positioned in engagement with the face plates 15 and 16, respectively. The jaws are closed to move toward the workpieces. The yoke 26 functions to allow the two jaws to move forwardly until they contact the respective workpieces 52 and 53 whereupon they hold the workpieces equally securely in position as illustrated in this figure.

While particular forms of this invention has been illustrated, other applications and modifications will occur to those skilled in the art and it is intended by the accompanying claims to cover all modifications within the spirit and scope of the invention.

What is claimed is:

1. A vise for securing a workpiece on a milling machine or the like comprising a base having a fixed jaw and two sliding jaws mounted thereon and movable along lines parallel to one another, means for moving said sliding jaws toward and away from said fixed jaw, said means including a yoke extending transversely of said sliding jaws and having its end pivotally and slidable engaging respective ones of said sliding jaws, said means for moving said jaws being positioned to move the center of said yoke toward and away from said fixed jaw during the operation of said vise and to move said sliding jaws into respective selected positions with respect to said fixed jaw, and a cylindrical member mounted in said yoke near the center thereof for movement about an axis substantially normal to said base, said member having a sloping surface on one side in a position for engagement by said means for moving said jaws whereby a downward pressure is exerted on said yoke.

2. The invention of claim 1 wherein said sliding jaws are spaced from one another and including a spacer positioned between said sliding jaws for maintaining their parallel positions.

3. A vise for securing a workpiece on a milling machine or the like comprising a base having a fixed jaw and two sliding jaws mounted thereon and movable along lines parallel to one another, means for moving said sliding jaws toward and away from said fixed jaw, said means including a yoke extending transversely of said sliding jaws and having its end pivotally and slidable engaging respective ones of said sliding jaws, said means for moving said jaws being positioned to move the center of said yoke toward and away from said fixed jaw during the operation of said vise and to move said sliding jaws into respective selected positions with respect to said fixed jaw, and means effective on forward movement of said driving means for urging said yoke downwardly for more securely holding a workpiece in position in said vise.

4. The invention set forth in claim 3 including a finger clamp supported at one end on one of said sliding jaws and bearing on the workpiece at its other end for holding the workpiece in position, and means securing an intermediate portion of said clamp to the adjacent end of said yoke and clamping it thereto for retaining said clamp in secure engagement with the workpiece.

* * * * *